H. J. Behrens,
Rotary Steam Engine.
N° 53,915. Patented Apr. 10, 1866.

Witnesses.

Inventor.

UNITED STATES PATENT OFFICE.

HENRY J. BEHRENS, OF NEW YORK, N. Y., ASSIGNOR TO HIMSELF, HENRY C. DART, AND EDWARD DART, OF SAME PLACE.

IMPROVEMENT IN ROTARY ENGINES.

Specification forming part of Letters Patent No. 53,915, dated April 10, 1866.

*To all whom it may concern:*

Be it known that I, HENRY J. BEHRENS, of the city, county, and State of New York, have invented a new and Improved Rotary Engine; and I do hereby declare that the following is a full, clear, and exact description of the same, reference being had to the accompanying drawings, forming a part of this specification, in which—

Figure 1:
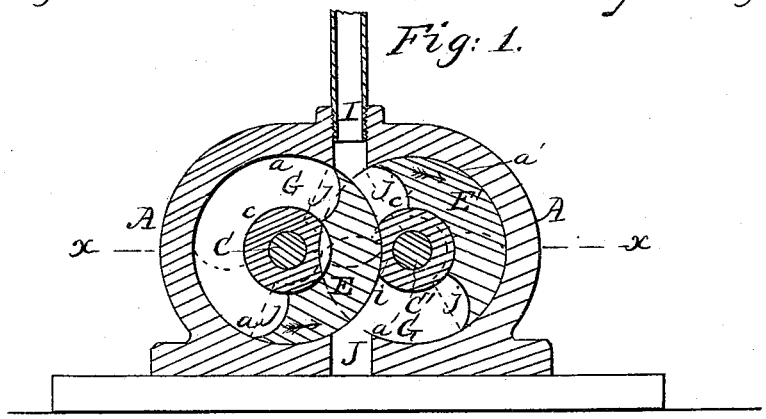
Figure 2:
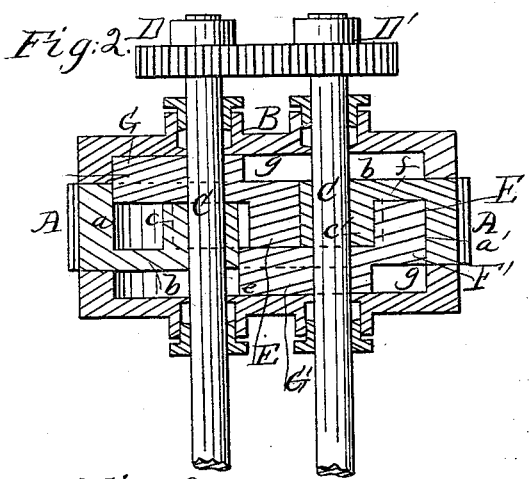
Figure 3:
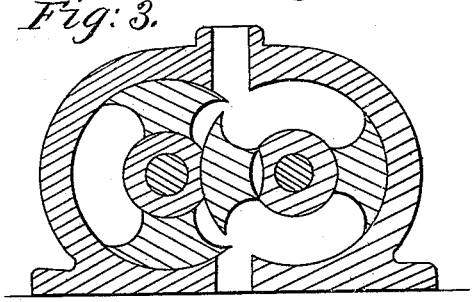

Figure 1 is a vertical section of the engine, in its simplest form, in a plane parallel with its planes of rotation. Fig. 2 is a horizontal section of the same in the plane indicated by the line *x x* in Fig. 1. Fig. 3 is a section, corresponding with Fig. 1, of a modification of the engine.

Similar letters of reference indicate corresponding parts in the several figures.

This engine is designed more especially for use as a motor, in which case it may be driven by steam, water, or other fluid; but it may, by having power properly applied to it externally, be used as a pump. The pistons, attached to two parallel shafts geared together so as to rotate in opposite directions at the same velocity, are of the form of segments of rings concentric with their respective shafts. Their outer arc-formed surfaces are fitted to and rotate within two parallel laterally-communicating bores in the same cylinder or casing, and their inner arc-formed surfaces are fitted to and rotate around two stationary hubs concentric with their respective shafts and bores of the cylinder. The axes of the shafts and their respective bores of the cylinder are situated at such distance apart, and the aforesaid fixed hubs are so recessed in concave arc form that the outer arc-formed face or faces of the piston or pistons of one shaft fit the recess in the fixed hub which surrounds the other shaft in such manner as to prevent the steam, water, or other fluid from passing between the piston of either cylinder and the hub of the opposite one. The induction and eduction pipes are arranged in opposite positions where the two bores of the cylinder meet.

In the operation of the engine as a motor, the steam or other motive agent acts upon the piston or pistons of each shaft alternately, while the piston, or one of the pistons, of the other shaft, serves as an abutment.

In the operation as a pump, the vacuum is produced for the entrance of the liquid and the liquid expelled by the piston or pistons of each shaft alternately.

To enable other skilled in the art to construct engines according to my invention, I will proceed to describe it with reference to the drawings.

The engine represented in Figs. 1 and 2 has but one piston attached to each shaft.

A is the cylinder or casing, having two parallel cylindrical bores, *a a'*, the axes of which are at a distance apart equal to about two-thirds of the diameter of the bores themselves, so that the two bores intersect each other and have a lateral communication, as shown in Fig. 1. These bores are commenced at opposite sides of the cylinder, as shown in Fig. 2, but do not extend quite through the cylinder *a*, portion *b* of the metal of the cylinder being left solid at the back of each bore for the support of the fixed cylindrical hubs *c c'*, which are concentric with their respective bores. The cylinder is fitted with two removable heads, B B, which are bored through concentrically with the bores *a a'*, for the passage of the two parallel shafts C C', which also pass through and fit concentric bores in the hubs *c c'* and parts *b b* of the cylinder. The bores in the cylinder-heads may be fitted with stuffing-boxes, or otherwise made tight enough around the shafts to prevent leakage. The shafts are geared together by a pair of spur-gears, D D', having a uniform number of teeth, so that when one rotates the other must rotate at the same velocity.

E is a piston attached to the shaft C, and E' is a piston attached to the shaft C'. These pistons project from the inner or facing sides of two disks, F F', which are firmly secured, one to each of the two shafts C C', and which fit snugly, one to each of the bores *a a'* of the cylinder. The said pistons may be either cast in the same piece with their respective disks, or otherwise firmly secured thereto, and each forms nearly half of a ring, the outer arc fitting to its respective bore, *a* or *a'*, and the inner arc to the hub *c* or *c'*, as shown in Fig. 1, and the face which is perpendicular with the planes of rotation of its disk fitting to work against the face of the disk of the other piston, as shown at *e*, Fig. 2, and to the back of its respective bore in the cylinder, as shown at *f* in the same figure. The disks also fit snugly against the ends of the hubs $c\ c'$, as also shown in the latter figure.

On the opposite face of each disk to that on which the piston is arranged, and on the opposite side of the axis thereof, there is secured to the disk a counter-balance, G, to counterbalance the weight of the piston, and the heads B B of the cylinders are recessed, as shown at $g\ g$ in Fig. 2, for the reception of these counter-balances.

$i\ i'$ are the recesses formed in the hubs on the sides which are nearest each other, for the passage of the pistons, each recess being of a form to fit the outer arc of the piston which rotates around the other hub, as shown in Fig. 1, and prevent the passage of steam, water, or other fluid between them. The pistons are so arranged with respect to their respective shafts, and to each other, that when one is situated directly over its shaft the other is directly under its shaft, as shown in red outline in Fig. 1. Their ends are hollowed out, as shown at $j\ j$, Fig. 1, in order that they may pass each other in their revolution with very little space between them.

I is the induction-pipe, communicating with the cylinder at the upper junction of the two bores $a\ a'$, and J is the eduction-opening, communicating with the cylinder at the lower junction of the two bores, as shown in Fig. 1.

To operate the engine as a motor, the steam, water, or other motive fluid is admitted to the cylinder between the pistons by opening the eduction-pipe I, and operates on the ends of one and the other piston alternately, the outer circumferential face of each operating as an abutment, while the fluid acts upon an end of the other one.

Suppose the two pistons to be in the position shown in red outline in Fig. 1, the piston E′ operates as an abutment, while the fluid acts upon the piston E and drives it in the direction of the arrow, (shown upon it,) and the gearing drives the piston E′ in the opposite direction. (Indicated by the arrow upon it.) This action continues until the forward end of the piston E passes the induction-opening, as shown in black outline, when the fluid acts upon the piston E′ and produces its continued revolution, while the continued revolution of E, which now acts as an abutment, is produced by the gearing. The fluid acts in the same manner upon each piston during one-half of a revolution, thus acting upon one or other throughout the whole revolution, and escaping in front of the pistons by the eduction-opening J, as the spaces in front of the pistons are alternately brought into communication with said opening in their revolution.

In the modification of the engine shown in Fig. 3 there are two pistons in each bore of the cylinder, arranged on opposite sides of their respective shafts, and one upon each shaft is acted upon during one-fourth part of a revolution at a time, a piston on one shaft and one on the other shaft being acted upon alternately. By thus applying two pistons one is made to balance the other.

The engine is capable of other modifications. For instance, here may be pistons on opposite sides of each of the disks F F′, in which case the pressure upon one side of the disk may be balanced by that on the other. Again, there may be two disks on each shaft with pistons on their opposed faces, in which case the fixed hubs may be either attached, the cylinder parallel with its planes of rotation.

It will be readily understood by the skilled engineer that by applying power to one or both of the geared shafts outside of the cylinder the engine may be used as a pump, the water or other fluid to be pumped entering by the induction-pipe into the vacuum formed behind the pistons in their revolution, and being driven before them through the eduction-pipe.

What I claim as my invention, and desire to secure by Letters Patent, is—

1. The concentric fixed hubs, recessed, substantially as described, in combination with the two geared shafts, their attached pistons, and the cylinder, substantially as herein set forth.

2. The pistons attached to the facing sides of two disks secured to their respective shafts, and so arranged that the piston or pistons of one shaft work against the face of the disk of the other shaft, substantially as herein described.

HENRY J. BEHRENS.

Witnesses:
HENRY T. BROWN,
J. W. COOMBS.